(No Model.) 2 Sheets—Sheet 1.

G. A. STEVENS.
CORN HUSKING ATTACHMENT FOR FEED CUTTERS.

No. 561,450. Patented June 2, 1896.

WITNESSES:

INVENTOR
G. A. Stevens
BY
ATTORNEYS.

(No Model.) 2 Sheets—Sheet 2.
G. A. STEVENS.
CORN HUSKING ATTACHMENT FOR FEED CUTTERS.
No. 561,450. Patented June 2, 1896.
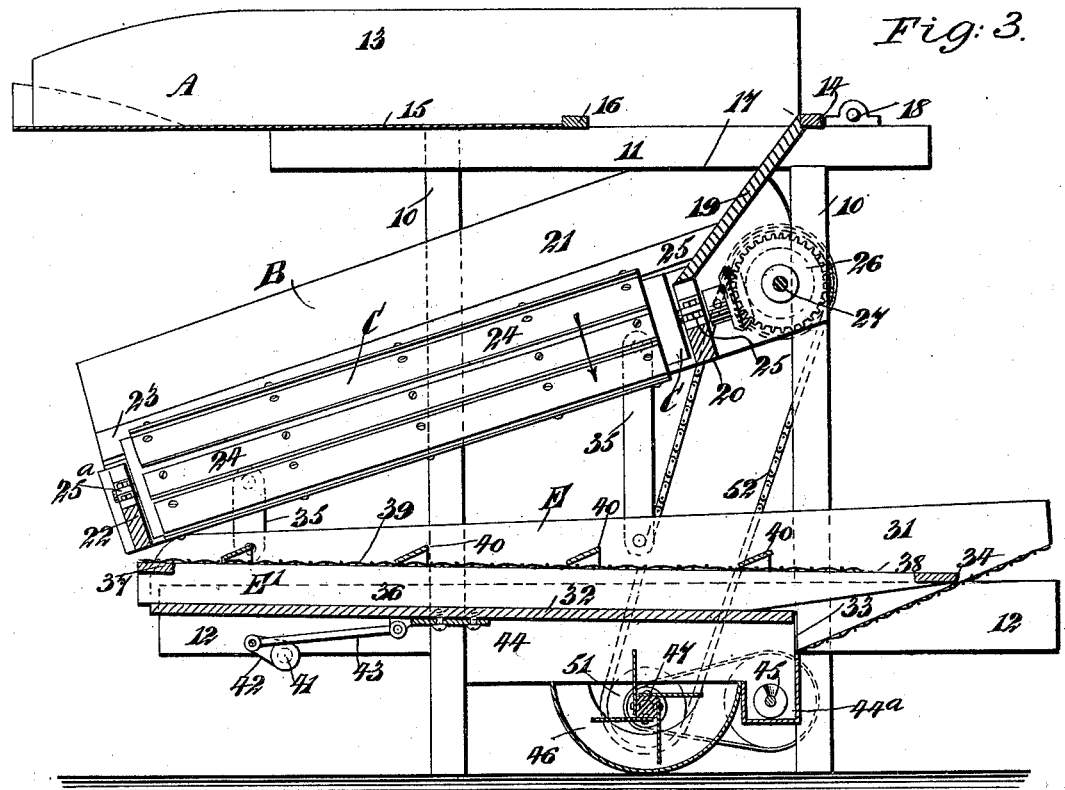
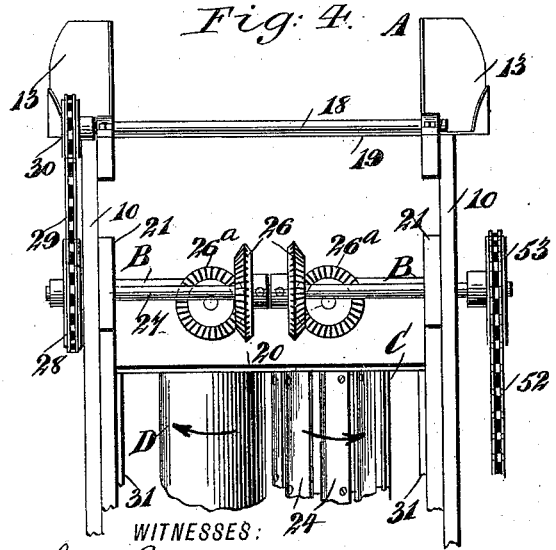
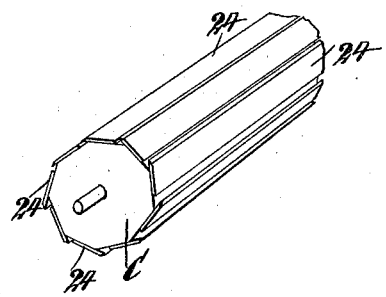
WITNESSES:
INVENTOR
G. A. Stevens.
BY
ATTORNEYS.

United States Patent Office.

GEORGE ARTHUR STEVENS, OF RINGWOOD, ILLINOIS.

CORN-HUSKING ATTACHMENT FOR FEED-CUTTERS.

SPECIFICATION forming part of Letters Patent No. 561,450, dated June 2, 1896.

Application filed January 31, 1896. Serial No. 577,500. (No model.)

*To all whom it may concern:*

Be it known that I, GEORGE ARTHUR STEVENS, of Ringwood, in the county of McHenry and State of Illinois, have invented a new and Improved Corn-Husking Attachment for Feed-Cutters, of which the following is a full, clear, and exact description.

My invention relates to a machine in which is combined a mechanism for cutting feed, especially cornstalks, and for husking the corn.

The object of the invention is to provide a machine in which the cornstalks may be cut into suitable lengths for feed simultaneously with the effecting of the husking of the ears of corn, and to so construct the husking mechanism that but few of the kernels of corn will be separated from the cob, and whereby, further, should any of the kernels of corn become detached during the process of husking said kernels will be caught and carried to a conveyer, together with the husks of corn, thus preventing the loose or shelled corn from being fed to the stock together with the cut feed, since it is more desirable to feed the kernels of corn in a pulverized condition.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
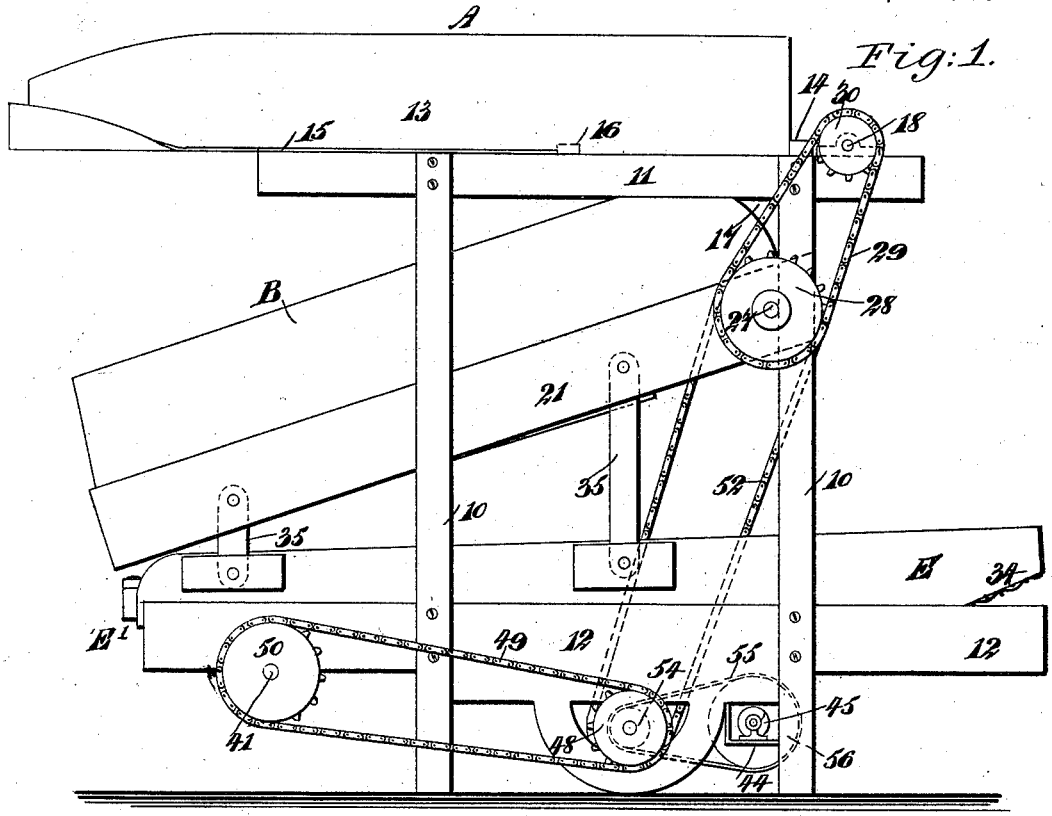
Figure 2:
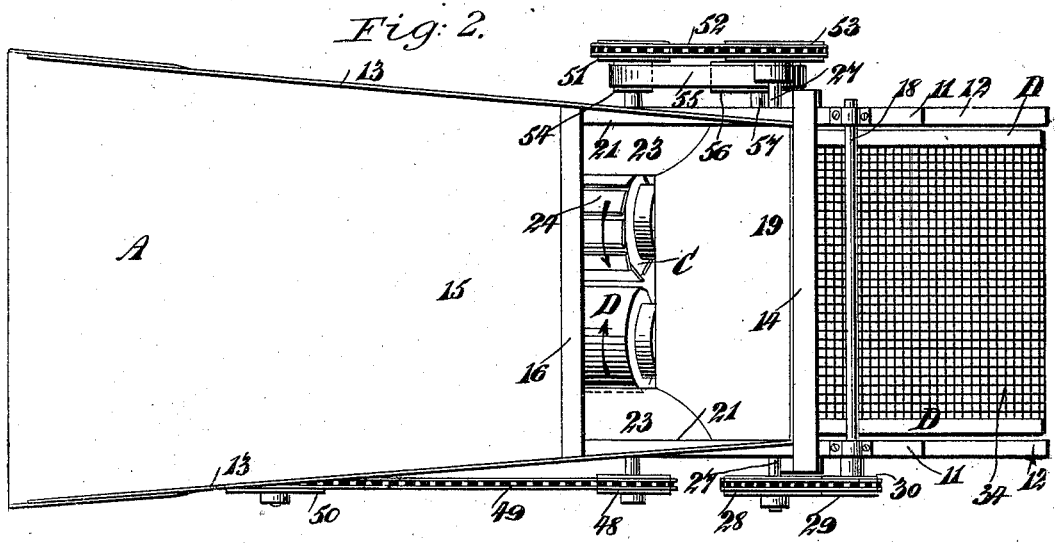

Figure 1 is a side elevation of the improved machine. Fig. 2 is a plan view of the same. Fig. 3 is a longitudinal vertical section through the central portion of the machine. Fig. 4 is a front elevation of the upper portion of the machine, illustrating particularly the driving-gears for the husking-rollers; and Fig. 5 is a detail perspective view of one end of a husking-roller carrying the husking blades or knives.

The prime object of this invention, in addition to providing a machine for simultaneously cutting the cornstalks into feed and husking the ears of corn, is to provide a means whereby the stalks of corn, with their ears attached, may be permitted to remain in shocks until required for use as feed, thereby preventing the cornstalks from becoming moldy or musty, which frequently happens when the cornstalks are all cut into feed at the early portion of the season. The improved machine permits of the stalks being preserved for such a length of time in their natural condition that they may be fed substantially fresh to the stock.

In carrying out the invention a suitable number of uprights 10 is provided as a portion of the frame, the uprights being connected at the top by longitudinally-located cross-bars 11 and at the bottom by corresponding cross bars or beams 12. The bottom cross bars or beams are preferably longer and wider than those at the top, and both sets of cross-bars extend beyond the front and rear uprights of the frame. The frame thus constructed is adapted to support at the top a feed-table A, which is made of the ordinary or of any desired shape, and comprises side bars 13, which converge at their forward ends and extend from a point at the rear of the frame substantially to the front portion thereof, connecting with a cross-bar 14, usually located over the forward uprights 10, but the bottom 15 of the feed-table does not extend so far in a forwardly direction, being connected at its forward end with a cross-bar 16, spaced a suitable distance from the forward cross-bar 14, as is best shown in Fig. 2, forming an opening 17 between the forward end of the machine and the forward end of the bottom of the feed-table.

A shaft 18 is journaled upon the forward portions of the upper cross-bars 11 at the sides of the frame, and the aforesaid shaft 18 is provided with any approved form of cutters necessary or adaptable for the cutting of cornstalks into lengths or shreds. In fact, the cutters on the shaft 18 may be of the type common to hay or straw cutters.

A front board 19 is projected downwardly and forwardly from the forward transverse cross-bar 14 of the frame, and at its lower end is preferably connected with a substantially straight or somewhat forwardly-inclined board 20, the inclined front board 19 and the connected board 20 constituting the forward portion or end of a trough B. The trough is inclined from the upper front portion of the frame downwardly and rearwardly, as shown in Figs. 1 and 3, and the side bars 21 of the trough are made to extend forwardly beyond the front boards 19 and 20, as is best shown in Fig. 3, and likewise extend upward at each side of the opening 17 in front of the bottom of the feed-table.

Between the top and bottom of each side of the trough B a downwardly-inclined guide-board 23 is secured to the said sides, and the rear end of the trough is closed at its bottom portion by a suitable back-board 22, which may be and usually is of corresponding shape to the lower front or upper board 20.

The husking-rollers C and D are located in the bottom portion of the trough B between its sides, the bottom of the trough being open. These rollers are in pairs and any desired number of pairs may be employed. Of each pair of rollers the roller D is practically smooth throughout its length; but it may be roughened to a degree, if required. The opposing roller C is polygonal in cross-section, as shown in Fig. 5, except at its extremities, where the said roller is preferably reduced in diameter and is of circular shape.

A blade or a knife 24 is secured upon each face of the husking-roller C, and these knives extend preferably in an unbroken manner from one end of the roller to the other, or practically so. The cutting edges of the knives are made to face in direction of the opposing smooth husking-roller D, and these rollers are adapted to revolve in direction of each other, and are so placed relative to one another that they converge at their lower ends. Suitable bearings 25 are provided for the trunnions of the husking-rollers at the front portion of the trough, and bearings 25ᵃ are likewise provided for the said rollers at the lower or rear end of the trough, as shown in Fig. 3.

The rollers are directly driven through the medium of a shaft 27, which is journaled in the extended forward end of the trough B below the inclined front board 19. This shaft is provided with two beveled gears 26, which mesh with correspondingly-shaped gears 26ᵃ, secured upon the forward ends of the trunnions of the husking-rollers, as is best shown in Fig. 4.

Preferably a sprocket-wheel 28 is secured upon one end of the shaft 27, being connected by a belt 29 with a smaller wheel 30 of like character, secured upon the corresponding end portion of the cutter-shaft 18, as is also best shown in Fig. 4. A reciprocating receiving-table E is located within the frame below the husking-rollers, and this table E consists of side pieces 31, provided with a tight bottom 32, and the bottom extends from the rear end of the side pieces substantially the length of the husking-rollers and terminates short of the forward end of said side pieces, as shown in Fig. 3, and where the bottom 32 terminates the side pieces of the receiving-table are made much wider, forming a shoulder 33, which extends downward below the bottom, and from the said shoulder the forward end portions of the side pieces of the said receiving-table at the bottom are given an upward inclination, the inclined surfaces having a screen 34 secured thereto, adapted to form a sieve, and the said sieve or screen extends from the lower end of the said shoulders to the forward extremity of the said receiving-table, as is shown in Figs. 2 and 3.

The receiving-table has movement between the lower side bars 12 of the frame, as shown in Figs. 1 and 3, and is supported by links 35, pivotally connected to the side pieces ordinarily upon the outer faces thereof, and being also pivotally connected with the inner faces of the sides of the trough B, as is clearly shown in Fig. 1.

A sieve or screen E' is adapted to be supported upon the tight bottom of the receiving-table E, and this screen or sieve, together with the screen 34, is carried beyond the cutters upon the feed-shaft 18, and the forward end of the sieve or screen E' extends, preferably, but a short distance over the screen 34 of the receiving-table E. The sieve or screen E' is held upon the receiving-table preferably by frictional contact only, and comprises side pieces 36, connected by front and rear cross-bars 37 and 38, the screen-surface 39, which may be of any desired material, extending from side to side of the frame thus made and from end to end thereof at the top.

The under edges of the forward portion of the side bars of the said screen E' are preferably given an upward inclination, as shown in Fig. 3, in order to facilitate the delivery of the material from the bottom 32 of the receiving-table to the screen-surface 34 of the latter.

The difference between the screen-surfaces 34 and 39 will be as occasion may demand; but preferably the upper screen-surface 39 is of much larger mesh than the lower and forward screen-surface 34, and the bottom 32 of the receiving-table is given an inclination from the rear forwardly and downwardly in order that the material on this bottom may gravitate to the forward and lower screen-surface 34. In order that the material delivered to the upper screen E' may be retarded in its passage from the rear to the forward end of this screen, baffle-bars 40 are located transversely over the top of the screen, being given, preferably, an upward inclination in direction of the forward end of the machine, as shown in Fig. 3.

The receiving-table E, and consequently the upper screen E', is given a reciprocating movement ordinarily through the medium of a shaft 41, journaled in the lower side bars 12 of the frame near the rear end of the machine, and the said shaft is provided with a crank-arm 42, preferably centrally located, the said arm being pivotally connected with the under face of the bottom of the receiving-table through the medium of a link 43 or its equivalent.

Below the forward portion of the bottom 32 of the reciprocating receiving-table E a box 44 is formed, provided with a depression 44ᵃ in its bottom at its forward end, the box being open at the said forward end above the said depression, and the material which is delivered to the screen-surface 34 of the reciprocating table is delivered into the pocket 44ᵃ of the aforesaid box. A conveyer 45 of any approved construction is located in the box 44 and extends from side to side of the machine, and the said box is open at one of its ends, so that the material carried by the conveyer may be delivered wherever desirable.

A preferably-semicircular casing 46 is located at the bottom of the box 44, adjacent to its pocket, and the box is open above the casing in order that a fan 47 may be placed within the casing and may extend a predetermined distance within the box, as shown in Fig. 3. The shaft upon which the fan 47 is mounted is provided with a sprocket-wheel 48 or its equivalent at one end, and this sprocket-wheel carries a link belt 49, connected also with a wheel 50, secured upon the corresponding end of the crank-shaft 41, imparting reciprocating motion to the receiving-table, as is illustrated in Fig. 1.

At the opposite end of the fan-shaft a second sprocket-wheel 51 is secured, being connected by a chain belt 52 with a sprocket-wheel 53, located on the drive-shaft 27 of the husking-rollers. The fan-shaft at that end carrying the aforesaid sprocket-wheel 51 is also provided with a pulley 54, which is connected by a belt 55 with a pulley secured upon the shaft supporting the conveyer, as illustrated in Fig. 2. The main driving-pulley of the machine is preferably located on the crank-shaft 41 at the end opposite to that at which the sprocket-wheel 50 is placed.

In the operation of the machine the stalks are fed forwardly on the feed-table to be cut by the cutters on the shaft 18 into predetermined lengths. As the stalks are fed forward the ears of corn will be snapped from the stalks by the feed-cutter rollers and knives and will drop downward into the trough B. The ears of corn in their husks will then be received between the husking-rollers C and D, and owing to the long knives on the rollers C the husks will be stripped from the ears of corn quickly and thoroughly, the separation being in direction of the length of the ears, and the husks will be carried down upon the upper sieve or screen E', together with the loose kernels of corn, while the husked ears will simply slide down the inclined surfaces of the rollers C and D and will be received in a basket or upon a conveyer. The laterally-reciprocating movement of the receiving-table will cause the husks and the loose kernels of corn to be carried gradually forward, being agitated throughout their forward movement, so that the loose kernels of corn will drop downward through the meshes of the sieve on the bottom of the receiving-table E, and will be conveyed by the said bottom of the table to the sieve-section 34 thereof, and sundry of the kernels drop directly upon the screen, the husks being delivered in a body from the forward end of the screen E'. The action of the fan will be such as to separate foreign matter from the loose kernels of corn, permitting the same to be delivered in a clean state to the conveyer 45, and the said fan may also act to blow the husks from the machine.

Having thus described my invention, I claim as new and desire to secure by Letters Patent—

1. In a husking-machine, the combination, with a substantially smooth roller, of an adjacent roller having flattened peripheral surfaces, and blades longitudinally located upon the said flattened surfaces, the cutting edges of the blades in the revolution of the rollers being made to face the substantially smooth roller, as and for the purpose specified.

2. In a corn-husking machine, a trough and husking-rollers journaled therein, the husking-rollers having a downward inclination and located to converge at their lower ends, one of the said rollers being substantially smooth and the other having a series of longitudinally-located blades secured thereon, the cutting edges of which blades are adapted to face the smooth roller when the said rollers are revolved, and a driving mechanism for revolving the said rollers in direction of each other, as and for the purpose specified.

3. A husking-roller having a series of plane longitudinally-extending faces and a cutting-blade secured on each face, the cutting-blades extending longitudinally and being capable of cutting the husks in the husking operation, substantially as described.

4. The combination in a corn-husking machine, of a plain roller and a companion roller having a series of plane longitudinal faces, the companion husking-roller having secured to each face and extending longitudinally a cutting-blade, the blades coöperating with the plain roller and being capable of cutting the husks in the husking operation, substantially as described.

5. A husking-roller having a series of plane longitudinal surfaces, and cutting-blades secured on said surfaces and extending longitudinally, the cutting-blades having their edges overlapped by each other and being capable of cutting the husks in the husking operation, substantially as described.

GEORGE ARTHUR STEVENS.

Witnesses:
EDMUND H. DODGE,
JOHN V. BUCKLAND.